United States Patent [19]
Gazda et al.

[11] 3,913,625
[45] Oct. 21, 1975

[54] POLY-POLYMER PLASTIC MATERIAL AND DEVICE MADE THEREFROM

[75] Inventors: Chester T. Gazda, Chicopee; James M. Lalikos, Springfield, both of Mass.

[73] Assignee: Titeflex, Springfield, Mass.

[22] Filed: June 14, 1972

[21] Appl. No.: 262,761

[52] U.S. Cl. ............... 138/140; 138/145; 138/127
[51] Int. Cl. ...................... F16l 9/14; F16l 11/12
[58] Field of Search ........... 138/123, 127, 129, 137, 138/138, 140, 145, 150, 153, DIG. 3, DIG. 7

[56] References Cited
UNITED STATES PATENTS

| | | | |
|---|---|---|---|
| 2,713,383 | 7/1955 | Kennedy | 138/DIG. 7 |
| 2,768,925 | 10/1956 | Fay, Jr. | 138/DIG. 3 |
| 2,773,781 | 12/1956 | Rodman | 138/DIG. 3 |
| 2,787,289 | 4/1957 | Press | 138/DIG. 3 |
| 2,829,671 | 4/1958 | Ernst et al. | 138/138 |
| 2,941,911 | 6/1960 | Kumnick et al. | 138/129 |
| 3,018,800 | 1/1962 | Hanssens | 138/125 |
| 3,034,943 | 5/1962 | Cravotta | 138/178 |
| 3,245,431 | 4/1966 | Coe | 138/125 |
| 3,266,527 | 8/1966 | Ross | 138/129 |
| 3,491,799 | 1/1970 | Foll | 138/129 |

OTHER PUBLICATIONS

Condensed Chemical Dictionary, 6th Ed., Rose, (1961), pp. 267, 559, 922.
The Plastics Manual, 3rd Ed., Editor: A. E. Lever, 1966, pp. 34, 35.

*Primary Examiner*—James J. Gill
*Assistant Examiner*—Anthony V. Ciarlante

[57] ABSTRACT

An admixture of silicone polymer is mixed with granulated polytetrafluoroethylene (TFE) (or related fluoroplastic material) particles in the general order of 0.001 inch – 0.015 inch in diameter grains. The admixture of silicone polymer and TFE is in the range of 25% to 75% by weight of TFE. When used to make any suitable device such as a hose, the mixture may be extruded contiguously over the hose surface. The admixture may also be formed into a tape configuration which may be wrapped over a base substrate. The material has substantial volume and flame resistance to provide ablation protection under conditions of high temperature. A similar material may optionally be applied over the outside of the hose as a scuff jacket, in which case the particles might be in the order of 0.005 inch – 0.010 inch in diameter.

26 Claims, 10 Drawing Figures

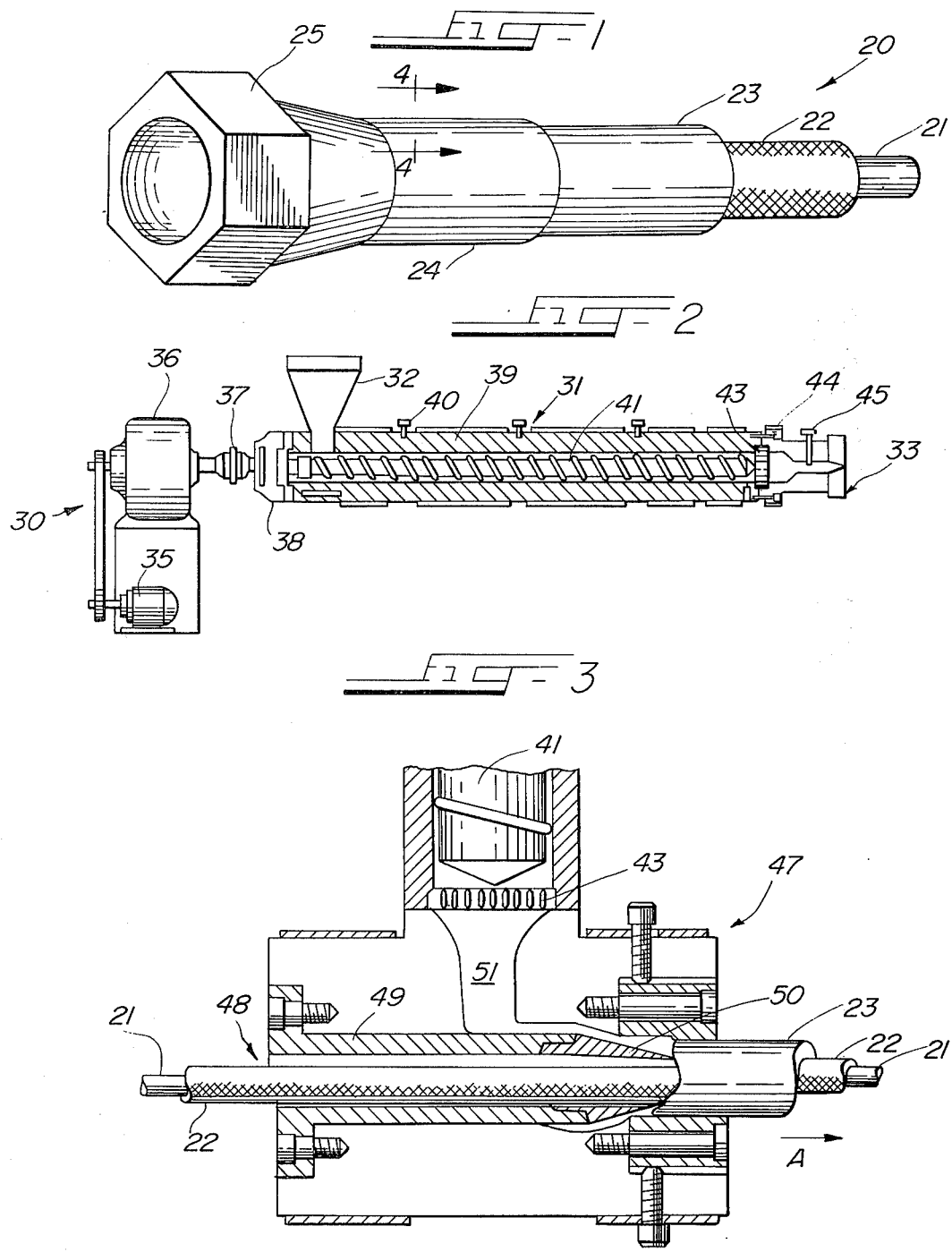

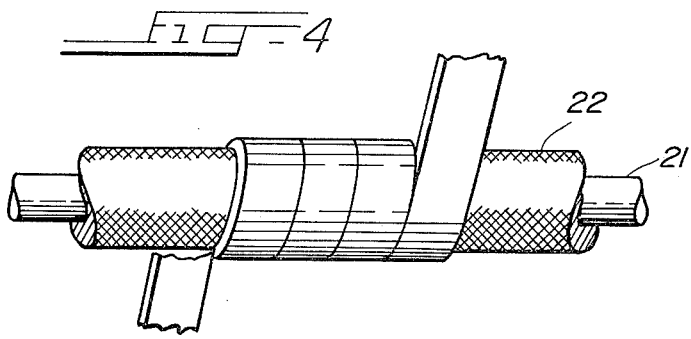
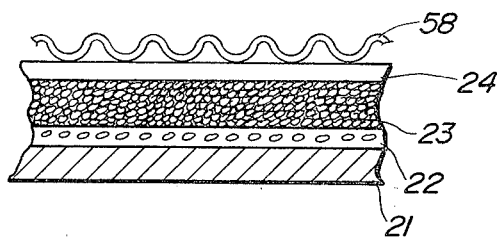
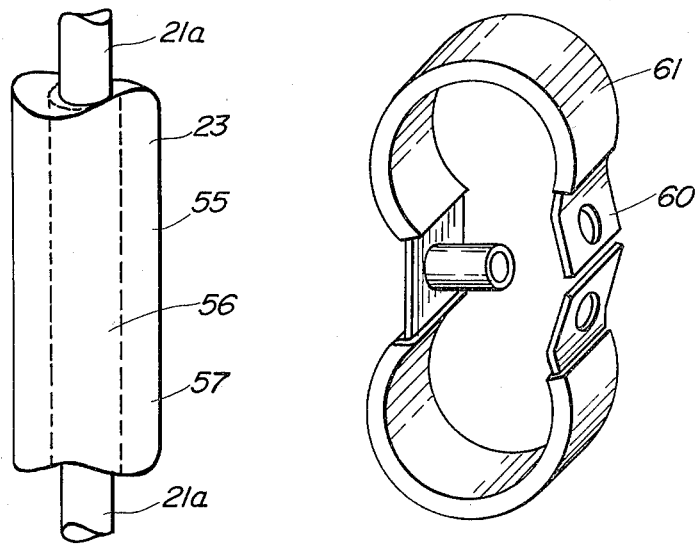
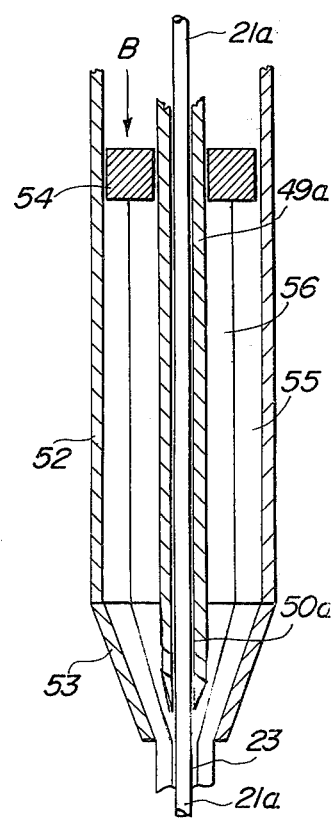

POLY-POLYMER PLASTIC MATERIAL AND DEVICE MADE THEREFROM

This invention relates to a composite material made from TFE (or a related fluoroplastic materia) mixed with a silicone polymer (or similar material) which may be used especially — although not exclusively — to fabricate tubing and hose assemblies for high performance aircraft.

Tubing, hose assemblies, and other similar products used on high performance aircraft demand special characteristics. To enumerate a few, the material should provide volume insulation for high temperature, abrasion resistant use. It should also have a low stick or slippery surface characterized by chemical inertness, flame resistance, high ablative characteristics, high dielectric properties, flexibility over a wide temperature range, a high strength to weight ratio, toughness, structural strength, and low permeability to moisture and vapors. Still other characteristics will readily occur to those who are skilled in the art.

These characteristics are exhibited by polytetrafluoroethylene (TFE), fluoroantedethylene-propylene (FEP), and similar plastics. However, these materials are sometimes difficult to work since they do not readily melt or flow. Thus, the problem is to find ways of working materials having the characteristics of TFE, FEP, or the equivalent. One approach is to provide a mixture of materials including TFE or FEP, which can be worked and yet retain the desired characteristics of TFE, FEP, or the equivalent.

When the mixture of materials is used on high performance aircraft, it must display all of the above described characteristics. In addition, when used to make tubes or hoses for such aircraft, it must also have high reliability so that they will not leak after many hours of flight vibration, even while filled with extremely volatile fuels or other materials during flight, high speed maneuvering at very high altitudes. The hose, device, or assemblies may be very long. Often, they are fished through small, tightly crammed spaces. They must be easy to replace. They should also display damage to a degree which facilitates easy trouble shooting and maintenance.

Accordingly, an object of this invention is to provide new and improved materials, especially materials which may be used to manufacture tubes, hoses or assemblies for high performance aircraft. Here, an object is to provide all of the characteristics demanded of such hoses, devices, or assemblies. In particular, an object is to provide an abrasion resistant surface for such hoses, devices, or assemblies. In this connection, an object is to provide a scuff coating which displays its own loss of integrity.

Another object of this invention is to provide a TFE or FEP combination material which is easy to work. In greater detail, an object is to provide a scuff coat made of material having flame and temperature resistance equal to or greater than the material it is to protect.

In keeping with an aspect of the invention, these and other objects of the invention are accomplished by an aggregate admixture of a base silicone polymer rubber mixed with granulated sintered TFE or FEP. The entire mixture may be extruded onto and around a hose, which serves as its own mandrel. This material serves as a scuff coat. If necessary or desirable, a second scuff coat or jacket may also be applied over the extruded material. This jacket may be either extruded or applied over the extrusion, as by a heat shrink process. If the extruded hose or scuff coat are made with different color strata, any damaging abrasion which penetrates one or more strata is visually displayed automatically. If the extruded material also includes a reflective or fluorescent material, undue scuffing damage is easily detected under appropriate light. Correspondingly, another method of identification would be to impregnate the scuff material with a radioactive tracer and identify the abraded particles using radioactive identification techniques.

The term "hose" is used herein to provide a concrete example of an exemplary use of the inventive material. Also, the inventive material is described in connection with a metallic bracket for holding a hose in a secure position. However, these references to these specific devices should not be taken as limiting upon the invention. Quite the contrary, the inventive material may be used for making any suitable device.

Preferred embodiments for accomplishing these and other objects may become more apparent from a study of the attached drawings wherein:

FIG. 1 is a stylized presentation, in perspective, of an exemplary aircraft hose made of the inventive material and by the inventive process;

FIG. 2 is a schematic and symbolic representation of an extruder;

FIG. 3 shows, in perspective, a portion of a crosshead die suitable for use with the machines of FIG. 2, illustrating one way of manufacturing the inventive hose;

FIG. 4, 5 and 6 show three alternative embodiments of an ablative volume coating for the inventive hose;

FIG. 7 is a cross-sectional view of the hose of FIG. 1, taken along line 4—4 thereof;

FIG. 8 shows, in perspective, a clamp for the inventive hose, using the inventive material as a cushion for protecting the hose;

FIG. 9 is a stylized cross-sectional view of a ram extruder for applying a coating with a plural strata color coding; and FIG. 10 is a schematic representation of the material extruded by the device of FIG. 9.

An exemplary hose 20 of FIG. 1 comprises a "Teflon" or TFE tube 21, having an outer covering, here shown as comprising a metal braid 22, an extruded scuff coat, flame protective coating 23, and an optional scuff jacket or coating 24. Any suitable metal fitting 25, of known design, may be attached to the end of the hose. The Teflon tube 21 might contain a material (fluid or gas) conveyed by the hose. It might also contain electrical wires or any other suitable device or material. In any event, the characteristics of the Teflon tube (or the equivalent) are those required to reliably contain the enclosed and conveyed material. Electrically conductive TFE hose or tubing may be used wherein the inner surface of said tubing contains carbon particles or other electrically conductive materials, such as aluminum, copper, silver and the like.

The braid 22 may be made from any suitable material, such as stainless steel, for example. Such stainless steel is very strong, and since it is an electrical conductor, it may be used to ground the hose and other things connected thereto. This conductivity is important in most aircraft hose, where a fire might result from an inadequate grounding. Alternatively, for hoses in which such conductivity is not desired, the braid may be a dacron or a nylon, such as a product of the DuPont Compay sold under the trademark NOMEX.

The Teflon tube 21 and stainless steel braid 22 are cited here by way of example only. Any other suitable material may also be used, depending upon the intended purpose of the end product.

The extruded scuff coat, flame protective material 23 is preferably an admixture of a silicone polymer rubber or polyvinylidine fluoride ($VF_2$), mixed with granulated particles of TFE, FEP, or the equivalent. In one exemplary material actually used with good results, the granules may be in the range from abut 0.005 to 0.075 inch in diameter; although the preferred range is in the order of 0.001 to 0.015 inch in diameter. However, for other desired effects the granules may be made either larger or smaller. These two materials are preferably mixed in the prortional range of 25% to 75% by weight, for either material, namely, the TFE or the silicone rubber compound, respectively. We have found that the inventive material composition may vary using (TFE) up to about 75% by weight and the binding adherent material, namely the silicone rubber compound, making up the remainder at about 25% by weight. The variation in percentages depends upon the adherent combination and the ablative characteristic properties. The silicone rubber or polyvinylidine fluoride ($VF_2$) are preferred for this mixture because of their properties which are particularly desirable for use in high performance aircraft. Silicone rubber compounds are generally classified as organo polysiloxanes and divided into two basic types. The conventional stocks, which are similar in plasticity to organic rubbers, are designed for molding, extrusion, or calendering followed by thermal curing or vulcanization. The other type, namely those compounds identified as room temperature vulcanizing (RTV) rubbers are of lower viscosity and are converted into elastomers at room temperature using a catalyst. The most important single one of these properties is silicone's reaction to burning. The silicone chars immediately, and the char becomes a heat refractory, highly resistant to further burning. The char is brittle, and the hose must be replaced, but meanwhile, it contains the fire and protects the aircraft.

Silicone or polyvinylidine fluoride ($VF_2$) are especially attractive at elevated temperatures where the change in strength is slight. Moreover, these materials do not become stiff at low temperatures. This makes them particularly suitable for use in aircraft where a wide range of environments exist. More particularly, the outstanding characteristics of these materials are: (1) thermal and oxidative stability at high temperatures, especially at 500° F. and above; (2) flexibility at temperatures below minus 100° F.; (3) excellent electrical insulation properties including resistance to corona breakdown; (4) general inertness and resistance to weathering, ozone, and many chemicals; (5) non-corrosive toward other materials; (6) non-flammability and self-extinguishing in case a fire should start; and (7) surface properties which prevent other materials from sticking thereto. Also, the low surface tension of the silicone fluids enables a thin film to be rapidly and completely distributed over all parts of a mold; therefore, the silicone is easy to work.

At elevated temperatures, silicone or polyvinylidine fluoride ($VF_2$) have a higher strength-to-weight ratio than do many metals, and silicone retains much of its physical strength after prolonged exposure to these high temperatures. The outstanding electrical properties of these materials are relatively unaffected by exposure to heat or to water vapor. A table of typical properties is as follows:

| | |
|---|---|
| Density, lb./cu. in. | 0.070–.075 |
| Compressive strength, psi | 1200–1400 |
| Tensile strength, psi | 400–440 |
| Elongation, % | 8–10 |
| Linear coefficient of expansion, in./in./°F. | 0.000016 |
| Water absorption, % 1 week soak at RT | Under 0.5 |
| Abrasion resistance, Taber (H-10 wheel, 100 gram weight, 1000 revolutions) Weight loss, gr. | 0.22 |
| Weather resistance | Excellent |
| Mild alkali resistance | Excellent |
| Salt resistance | Excellent |
| Acid resistance | Good |
| Oil resistance | Good. |

The TFE or FEP were selected for the mixture because of their outstanding characteristics. More particularly, fluoroplastics, manufactured from a copolymer of tetrafluoroethylene and hexafluoropropylene, have outstanding chemical, thermal, electrical, and physical characteristics. In addition, they offer fabricating advantages. By order of decreasing fluorine substitution and increasing processability, these materials include polytetrafluoroethylene (TFE); fluorinated ethylene-propylene (FEP); and chlorotrifluoroethylene (CTFE). Also available are several copolymers of halogenated and fluorinated hydrocarbons, including fluorinated elastomers.

Many of the desired characteristics and properties of fluoroplastics can be explained by considering their structure. The carbon atoms form a straight chain that is entirely and symmetrically surrounded by fluorine atoms bound to the carbon by strong links These chains are difficult to break by chemical or thermal action. The polymer has a high molecular weight, including long molecules comprising from 10,000 to 100,000 building blocks. Intermolecular forces are relatively low, in comparison with the strong intermolecular strength.

The properties of fluoroplastics include chemical inertness. Fluoroplastics resist the attack of nearly all chemicals, regardless of temperature. They are stable over a wide range of temperatures — from cryogenic temperatures below −425° F. to as high as 500° F. They have about the lowest coefficient of friction for any known solid. In summary, these materials have no-stick characteristics, excellent abrasion resistance, resistance to nuclear radiation and ultra-violet rays, good electrical properties, with a low dielectric constant and dissipation factor regardless of temperature and frequency, very low permeability to moisture and vapor, practically no moisture absorption, and high resistance to weather and ozone. A part molded from these fluoroplastic materials contracts about 2% when cooled to −300° F., and expands about 4% when heated from room temperature to 500° F. The TFE fluoroplastics do not melt, but they change into a gel at temperatures above 621° F. Therefore, it is desirable to use special methods somewhat similar to powder metallurgy, during manufacturing with them.

Because of its chemical inertness and low energy surface, standard FEP-fluorocarbon materials cannot usually or conveniently be bonded to substrates with conventional adhesives. However, these materials can be heat bonded to themselves and to many other materials without adhesives.

In the inventive use (namely as a scuff coat flame protective coating), one of the most desirable characteristics of the mixture of silicone and TFE, FEP (or the equivalent) large volume coating 23' of flame protective material resides in its ablative characteristics, which cools the tube. If there should be a fire in an area adjacent the hose 20, the coating material 23 does not burn, but experiences slow degradation of particles which carry off the surface heat (called an "ablative" material herein). Since coating 23 is relatively thick and heat insulating, the fire may burn for a substantial length of time before the fluid inside tube 21 is subjected to the temperature of the flame or the surroundings. In most modern aircraft, automatic flame extinguishing equipment will extinguish the fire long before tube 21 is so subject to flame temperatures. Furthermore, if the primary tubing 21 which carries the fluid is ruptured, the volume coating or tubing 23 will act as a barrier layer or a supplementary carrier for the fluid so as to allow a time element for the immediate shutdown or rerouting of the fluid system.

The optional scuff jacket 24 may also be extruded in place, or, it may be fitted over the extruded scuff coat, flame protective coating 23. This scuff jacket 24 provides a high degree of abrasion or wear resistance and flexibility. For critical characteristics, the scuff jacket 24 uses materials equal to or exceeding the desired characteristics of the extruded scuff coat, flame protective coating. A silicone or Teflon material is preferred for this scuff jacket 24 so that the temperature rating of the hose is not limited by the coat. A TFE or FEP mixture may also be used with larger particles of about 0.020 to 0.040 inch in diameter when extra heavy thickness is preferred for greater fire protection.

If the hose is made with different color strata, any abrasion damage to the hose is visually apparent, especially if the abraded material is reflective or fluorescent. A number of considerations apply to this coloring process. In greater detail, the inventive material tends to throw off particles of TFE or FEP as it is subjected to mechanical wear. These particles are electrostatic. Thus, they tend to cling to adjacent surfaces where they are visible. If aluminum dust, for example, is mixed into the particles, they are light reflective. If a fluorescent material is so mixed, the particles are fluorescent under ultra-violet light.

Thus, if a light is directed into the inside of a wing of an aircraft, for example, the particles will reflect or glow. It is not necessary to even see the hose in order to know that abrasion has occurred.

The colorant requirements are such that they should also have excellent heat stability, acid and alkali resistance, and dispersibility. The colorants must be stable at fabricating temperatures, which range up to 750° F. Colorants for use in polychlorotrifluoroethylene (CTFE) resins must be relatively non-reactive with the polymer. Pigments must be of small particle size for use in the fluorocarbons.

More particularly, it has been found that fluorocarbons may be suitably colored by the following pigments: ceramic black, chrome - cobalt - alumina, ceramic yellow, titanium pigments, cadmium sulfide, chrome - tin, cadmium mercury, cadmium sulfo-selenide, phthalocyanine, and nickel - azo. Silicone molding compounds may be colored by the following pigments: iron oxide, ceramic black, ultramarine blue, chrome - cobalt - alumina, ceramic yellow, titanium pigments, chrome - tin, cadmium mercury and cadmium sulfo-selenide.

EXAMPLE 1 — EXTRUSION PROCESS

One extrusion process used to apply the extruded scuff coat, flame protective coating 23 employs an extrusion machine, as shown in FIGS. 2 and 3. In greater detail, this machine comprises a drive means 30, a plastic transport mechanism 31, a feed hopper 32, and an extrusion die 33. The drive means 30 comprises a motor 35, a gear reducer 36, and a flexible coupling 37. The plastic transport mechanism includes a thrust bearing 38, a heated barrel 39 controlled by a plurality of thermocouple sensors 40, and a feed screw 41. The hopper 32 receives the plastic which is fed into the screw and transported by the screw to the extrusion die 33. At the extrusion die, there is a screen pack 43, a heater 44, and a thermocouple 45.

The general principles of a cross-head extrusion die are seen in FIG. 3. Cross-head dies are used for coating and jacketing operations. In coating, the tubing 21, 22 is introduced into the rear 48 of the cross-head and passes through the mandrel 49 and guider tip 50. The inventive material melt 51 is extruded around the tubing 21, 22 as it emerges from the guider tip 50. Channel space in the head is kept to a minimum to avoid hang-up areas and to insure uniform melt pressure distribution around the coating. The melt is applied inside the die or extrusion head while still under extruder pressure. Thus, a prefabricated combination of hose 21 and metal braid 22 is drawn through the head 47. The feed screw 41 delivers to head 47, the mixture 51 of silicone and the TFE or FEP granules. As the hose and braid combination are drawn in direction A through head 47, the scuff coat, flame protective coating 23 is extruded directly thereon, with bonding into the interstices of the braid.

One mixture actually made by this extrusion process included the following constituents:

MATERIALS FOR FABRICATION

The base polymer used is:
G.E. SE4527 silicone rubber
Sintered Teflon powder, Repro No. 3.010, nominal diameter particles
Virgin Teflon.
The following compositions were prepared:
25% sintered Teflon - 75% SE4527
50% sintered Teflon - 50% SE4527.
(This represents a maximum saturation of sintered powder only.)

Additions of virgin powdered Teflon aided in the preparation of the following:

1. 50% sintered Teflon -
   2% virgin Teflon powder -
   48% SE4527
2. 50% sintered Teflon -
   4% virgin Teflon powder -
   46% SE4527
3. 60% sintered Teflon -
   1% virgin Teflon powder -
   39% SE4527.

(The 50% - 4% - 46% and the 60% - 1% - 39% are maximum saturation levels that can still be processed.)

All the TFE - SE4527 compositions were prepared on a standard roll type rubber mill. Both sintered TFE and virgin TFE were added in small increments to fully plasticized rubber on the mill until desired compositions were achieved. Compositions were calendered to those thicknesses that facilitated ease of handling.

Using a screw type extruder, strips of uncured compounds were extruded. These strips were used for molding and hot air vulcanization evaluations.

Physical property tests for tensile elongation and abrasion were performed on extruded strip stock and molded abrasion buttons, on all compositions plus G.E. SE5701 silicone rubber. Abrasion tests were also performed on molded neoprene and Teflon buttons.

From the above tests, the 60% TFE — 1% virgin TFE — 39% SE4527 was selected for further evaluation.

EXAMPLE 2 — EXTRUSION PROCESS

An alternative extruder is seen in FIG. 9, which is particularly desirable when a multi-strata color is desired. Here the extruder comprises a cylinder 52 terminated at one end in a die 53 and at the other end by an extrusion ram 54. Inside the cylinder 52 is a mandrel 49a for separating the core or tube 21a from the running plastic inside the cylinder. The ram 54 is an annular shape to fit snugly over the mandrel 49a and to bear against plastic inside the cylinder 52.

A billet 55 of plastic is placed inside the cylinder 52. As the ram 54 is pressed in direction B, the plastic of billet 55 is squeezed and caused to flow through the reduced die 53. The plastic is extruded on and surrounds the core or tube 21a which is drawn through the ram 54, cylinder 52, and die 53, thereby forming the scuff coat, flame protective coating 23 around the core or tube 21a.

A ram die, such as this causes a laminar flow of plastic whereby the cross section of the billet is accurately preserved, in reduced scale, in the extrusion 23. Thus, if the billet has two colors, as at 55, 56, the extrusion will also have two colors (as seen in FIG. 10). Likewise, a scuff coat, flame protective coating 23 of any suitable number of colored strata may be formed around the core or tube 21a. Therefore, if the abrasion wears through the outside color 55, the distinctively colored center 56 is seen. In one embodiment, the pigment of strata 56 was electrically conductive material to provide for grounding the hose.

Accordingly, FIG. 9 shows means for simultaneously extruding around a core, a scuff coat, flame protective coating 23 of any suitable number of differently colored strata.

A material and mixing method used in this extrusion process are the same as that set forth above in Example 1.

Using the 60% - 1% - 39% composition to make a billet, extrusions were made on a hydraulic ram type extruder. The extrusions were in the form of solid rod and tube.

An extrusion was also made on the ram type extruder and consisted of a multiple layer construction. This new construction was fabricated as follows:

A portion of the 60% - 1% - 39% was mixed with 2% carbon black. This new black mixture was then placed on a preform mandrel and overwrapped with a standard 60% - 1% - 39% material. Preform of this type allowed the multi-layer extrusion.

If the opening in the die of either FIGS. 3 or 9 does not correspond to the desired finished cross section, it may be necessary, or simpler, to produce the desired finished cross section by a post-extrusion forming of the extrudate, after it has left the die. This final foaming may invole a drawdown, pressure, or a machining procedure. Sometimes the extruded coating 23 is exposed to air prior to the addition of a scuff jacket 24, if desired, since oxidation improves adhesion with some materials. Also, the surface tension of the melt relative to the surface tension of the substrate under contact conditions may affect the bond. A clean substrate surface will promote adhesion.

Room temperature vulcanizing silicone rubbers cure by two mechanisms. Some use a catalyst mixed with the compound before use. Others cure in place upon exposure to atmospheric moisture. The former type is available in a variety of compounds differing in the characteristics of the compound itself and in the properties of the elastomer obtained after curing. These compounds range in viscosity from readily pourable liquids to spreadable pastes. The time interval between catalyst addition and the onset of elastic character may be varied from a few minutes to several hours. Other materials are cured according to the characteristics of the particular constituents thereof.

Other plastics which are likely to be used cure at high temperatures, such as 700° F. However, such high temperatures are likely to damage the material of the tube 21. This damage does not occur with the inventive material, however, since coating 23 protects the tube 21, as it does during a fire.

Other embodiments of the invention do not extrude the scuff coat, flame protective coating 23 directly upon the tubing 21 or braid 22. Rather, the coating 23 is first formed into an intermediate ribbon or tape product which is thereafter wound upon the braid, and then heat bonded to itself. In greater detail, a flat film can be produced in any width up to about 72 inches, more or less. Generally, the lower limit on widths available is determined by the economics of the process, since too narrow a width sometimes involves too low an extruder output. Therefore, narrow widths may be slit from wider rolls. Here also, the tape may be extruded in two colors to provide a display of abrasion damage.

Extrusion may also be used for the production of continuous lengths of thermoplastic materials having a constant geometrical cross section. If the tape has a rectangular cross section, it may be wound directly around the braid 22, as shown in FIG. 4. As shown in FIGS. 5 and 6, the mixture may also be an extruded tape or ribbon with a step-like configuration. As the tape is wound around the braid 22, the complimentary steps come together to form a substantially continuous outer surface, as seen in FIGS. 5 and 6. For these embodiments, the extruded tape may be heat treated prior to wrapping to give it a permanent helix so that it may thereafter be wrapped directly on the braid 22 with greater ease.

With any of the embodiments, a corrugated outer covering or jacket 58 (FIG. 7) may be added to give a greater resistance to abrasion damage.

The slick abrasion resistant, non-stick outer coating is ideal for fishing the hose through small, hard to reach spaces, as in an aircraft wing. To secure the hose in place, or to hang it from a structure, a metal clamp (FIG. 8) is preferably used. Here, this particular clamp is adapted to hold two hoses in side-by-side relationship. However, it should be understood that any other suitable clamp may be formed.

In greater detail, a metal strap 60 is performed to surround two hoses 20 in side-by-side relationship. A cushion 61 of the inventive extruded material fits around the metal clamp to hold the hoses 20 without deforming or chafing them. Since the cushion 61 and the scuff coat, flame protective hose extrusion 23 are the same materials, and further, since the scuff jacket 24, if used, is compatible with this material, neither the hose 20 nor the cushion 61 will damage the other.

The advantages of the invention should now be clear. The hose may be made in a plurality of colored strata to show wear, and the particles given off as a result of wear are visually apparent even when the hose is not seen. The colored strata may be formed simultaneously in a single extrusion or sequentially by successive extrusions. Alternatively, the strata may be separate tubes which are brought together in a plurality of steps. The mixture of silicone (or the equivalent) and TFE, FEP (or the equivalent) are ten times more wear resistant than silicone, per se.

Still other uses of the invention material will readily occur to those who are skilled in the art. For example, when the granules are further reduced to about 0.001 to 0.002 inch in diameter and embedded in various elastomeric polymers at concentrations of about 10% to 50% by weight, the resulting aggregate material has a self-lubricating characteristic. Electrically conductive material of a relatively fine particle size, in the order of 10–80 millimicrons, may be mixed into the inventive material. This conductive material should be chemically inert to anything likely to be used inside the inventive hose. Also, it is obvious that the electrically conductive material must be compatible with silicone, TFE, and FEP. In particular, care should be taken to use an electrically conductive material (such as acetylene or carbon black) which is not damaged by curing temperatures likely to be encountered.

Since still other modifications may be made without departing from the scope and spirit of the invention, the appended claims are to be construed to cover all equivalent structures, processes, and materials.

We claim:

1. An abrasion resistant device comprising an inner tube for conveying fluid, said tube having thereover an outer plastic jacket providing an ablative scuff coating of a large volume of flame protective material, said material comprising sintered Teflon powder mixed with silicone rubber, said material experiencing a slow degradation of particles which carry off surface heat when subject to flame.

2. The device of claim 1 and a scuff jacket surrounding said material.

3. The device of claim 1 wherein said ablative coating comprises a low stick or slippery surface characterized by chemical inertness, flame resistance, high ablative characteristics, high dielectric properties, flexibility over a wide temperature range, a high strength to weight ratio, toughness, structural strength, and low permeability to moisture and vapors.

4. The device of claim 1 and a continuous reinforcing braid covering interposed between said tube and said ablative coating.

5. The device of claim 4 wherein said braid is metallic.

6. The device of claim 4 wherein said braid is an electrically conductive material.

7. The device of claim 4 wherein said braid is stainless steel.

8. The device of claim 1 and electrically conductive means interposed between said tube and said ablative coating, said conductive means being formed by an electrically conductive material embedded in at least a portion of said ablative coating.

9. The device of claim 1 wherein said inner tube is Teflon tubing located near the axial center of an elongated cylinder of said ablative material.

10. The device of claim 9 and a scuff jacket of silicone surrounding said cylinder.

11. The device of claim 9 and a scuff jacket of a similar material surrounding said cylinder.

12. The device of claim 9 and a scuff jacket heat shrunk over said cylinder.

13. The device of claim 9 and a scuff jacket extruded over said cylinder.

14. The device of claim 9 and an electrically conductive layer interposed between said tubing and said material.

15. The device of claim 9 wherein an electrically conductive layer is provided as integral strata of said cylinder.

16. An abrasion resistant device comprising an inner tube for conveying fluid, said tube having thereover an outer plastic jacket providing an ablative scuff coating of a large volume of flame protective material said material comprising sintered Teflon powder mixed with silicone rubber, said material experiencing a slow degradation of particles which carry off surface heat when subject to flame, and a scuff jacket surrounding said material, said ablative covering comprising an admixture of a silicone-type polymer mixed with granulated sintered particles from the class of polytetrafluoroethylene and related fluoroplastic materials, said particles having diameters in the general order of 0.001 inch to 0.015 inch in diameter grains, and said admixture of silicone polymer and particles being proportioned in the range of 25% to 75% by weight.

17. The device of claim 16 wherein said mixture of silicone-type material and particles is extruded contiguously over the surface of said tube, acting as its own mandrel.

18. The device of claim 16 wherein said mixture of silicone-type material and particles is formed into a tape configuration which may be wrapped over a base substrate.

19. A hose for a high performance aircraft comprising aggregate admixture of a base from the class of silicone polymer rubber or $VF_2$ mixed with granulated sintered material in the class of TFE, FEP, or CTFE, a tube, the mixture being extruded onto and around said tube which serves as its own mandrel to form a scuff coat applied over the tube, the extruded mixture being different colors in different strata, whereby any damaging abrasion which penetrates the scuff coat is visually displayed.

20. The hose of claim 19 wherein said strata are different layers of a single extrudate.

21. The hose of claim 19 wherein the extruded material includes a fluorescent material whereby undue scuffing damage is detected under ultra-violet light.

22. The hose of claim 19 wherein the extruded material includes a light reflective material whereby undue scuffing damage is detected by light reflection.

23. The hose of claim 19 and electrically conductive material interposed between said tube and said aggregate mixture.

24. The hose of claim 19 wherein said tube is TFE and said scuff coat is formed over the extrudate, said coat having a resistance to flame temperature which at least equals temperature resistance of said mixture.

25. The hose of claim 24 wherein the mixture is colored by a pigment in the class of ceramic black, chrome - cobalt - alumina, ceramic yellow, titanium pigments, cadmium sulfide, chrome - tin, cadmium mercury, cadmium sulfo-selenide, phthalocyanine, and nickel - azo, and the scuff coat is silicone rubber colored by a pigment in the class of iron oxide, ceramic black, ultramarine blue, chrome - cobalt - alumina, ceramic yellow, titanium pigments, chrome - tin, cadmium mercury, and cadmium sulfo-selenide.

26. A hose for a high performance aircraft, said hose comprising an inner Teflon tube having a laminated covering including metal braid, an ablative large volume flame protective coating of sintered Teflon powder mixed with silicon rubber over the metal braid, and a plastic scuff jacket over the protective coating.

* * * * *